(12) United States Patent
Matsushita et al.

(10) Patent No.: US 6,838,792 B2
(45) Date of Patent: Jan. 4, 2005

(54) LOW-PROFILE STEPPING MOTOR WITH TWO COILS ARRANGED FLUSH WITH EACH OTHER HORIZONTALLY

(75) Inventors: Kunitake Matsushita, Shizuoka-ken (JP); Hiroshi Sano, Shizuoka-ken (JP); Toshihiko Nagata, Shizuoka-ken (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 10/677,205

(22) Filed: Oct. 2, 2003

(65) Prior Publication Data

US 2004/0104626 A1 Jun. 3, 2004

(30) Foreign Application Priority Data

Nov. 28, 2002 (JP) ........................................ 2002-345380

(51) Int. Cl.[7] ........................ H02K 37/14; H02K 37/12; H02K 5/00
(52) U.S. Cl. ...................................... 310/49 R; 310/43
(58) Field of Search ............................... 310/49 R, 257, 310/254, 216, 218, 43, 45

(56) References Cited

U.S. PATENT DOCUMENTS 5,703,419 A * 12/1997 Mizutani .................. 310/49 R
6,703,728 B1 * 3/2004 Goubely et al. .......... 310/49 R

FOREIGN PATENT DOCUMENTS

| FR | 2 793 966 | 11/2000 |
| JP | 10 094237 | 4/1998 |

* cited by examiner

*Primary Examiner*—Tran Nguyen
(74) *Attorney, Agent, or Firm*—Choate, Hall & Stewart

(57) ABSTRACT

A low-profile stepping motor comprises: an upper twin-stator yoke plate composed of first and second upper stator yokes; a lower twin-stator yoke plate composed of first and second lower stator yokes; first and second coil units fixedly sandwiched between the upper and lower stator yoke plates so as to be arranged horizontally flush with each other; and a rotor assembly including a cylindrical magnet and disposed between the first and second coil units. In the stepping motor, one of the upper and lower twin-stator yoke plates is structured such that one half of its pole teeth partitioned in half by a predetermined datum line and open spaces each residing between two adjacent pole teeth of the other half are positioned symmetrically about the predetermined datum line, whereby the one twin-stator yoke plate can be used in common to the other twin-stator yoke plate.

5 Claims, 4 Drawing Sheets

PRIOR ART

LOW-PROFILE STEPPING MOTOR WITH TWO COILS ARRANGED FLUSH WITH EACH OTHER HORIZONTALLY

BACKGROUND OF THE INVENTION

1. Field of the Invention

The present invention relates to a stepping motor, and specifically to a low-profile stepping motor having its dimension reduced in an axial direction.

2. Description of the Related Art

Recently, in accordance with enhanced performance of various devices such as printers, facsimiles and floppy (Registered Trademark) disk drives, a stepping motor is required to be higher in torque, and lower in cogging torque and vibration. Under the circumstance, a PM (permanent magnet) stepping motor such as is disclosed in Japanese Patent Publication No. Hei 10-127024 has been extensively used to meet the requirements.

FIG. 1 is a partly cutaway perspective view of a conventional PM stepping motor. As shown in FIG. 1, the PM stepping motor generally comprises: a stator assembly 6 composed of two stator units 6A and 6B; a rotor assembly 13; a face plate 1 punched out of a stainless steel plate; and a front bearing 2 made of oil impregnated alloy. The stator units 6A and 6B each comprise: stator yokes 3a and 3b each punched out of a soft magnetic steel plate and each having a plurality of pole teeth 10 bent up along its inner circumference; and a coil 4 formed such that a copper wire with polyurethane insulation is wound on a bobbin 5 housed in the stator yokes 3a and 3b, and are attached back-to-back to each other. The rotor assembly 13 comprises: a rotary shaft 8; a cylindrical magnet 9 for magnetic field, having a plurality of magnetic poles at its circumferential surface, and having the circumferential surface opposing the pole teeth 10 of the stator yokes 3a, 3b; and a sleeve 12 to fasten the cylindrical magnet 9 and the rotary shaft 8 together such that the rotary shaft 8 is press fitted into the sleeve 12, and that the sleeve 12 with adhesive applied thereon is inserted into the cylindrical magnet 9. The rotor assembly 13 thus structured has its outer circumference (of the magnet 9) magnetized for a predetermined number of magnetic poles, and is rotatably disposed inside the stator assembly 6 such that the rotary shaft 8 is supported by the front bearing 2 and a rear bearing (not shown in FIG. 1), and that the magnetic poles oppose the pole teeth 10 with a slight gap therebetween.

The stator unit 6A is structured such that the pole teeth 10 of the stator yoke 3a mesh with the pole teeth 10 of the stator yoke 3b equidistantly from each other with a shift by an electrical angle of 180 degrees (half pitch). The stator unit 6B is of the same structure as the stator unit 6A. The stator units 6A and 6B thus structured are joined back-to-back to each other by molding with polymeric material or by plasma welding such that their respective pole teeth 10 and 10 are shifted from each other by an electrical angle of 90 degrees, whereby the rotor assembly 13 always starts its rotation in the same direction.

Recently, since the devices incorporating PM stepping motors are required to be downsized and lower profiled, the PM stepping motors are also required to be further lower profiled. The conventional PM stepping motor, however, is composed of two stator units joined to each other back-to-back thus making it extremely difficult or almost impossible to further reduce its profile dimension. And the conventional PM stepping motor uses four discrete stator yokes, which inevitably increases the number of the components and makes alignment troublesome.

There is another conventional PM stepping motor disclosed in Japanese Patent Publication No. Hei 5-336729, which has a double-rotor structure with two rotors stacked axially. This motor still has a problem similar to what is described above.

SUMMARY OF THE INVENTION

The present invention has been made in view of the above circumstance, and it is an object of the present invention to provide a low-profile stepping motor which is of a simple structure and which has its dimension drastically reduced in the axial direction.

In order to achieve the object, according to a first aspect of the present invention, a low-profile stepping motor generally comprises: a first stator unit; a second stator unit; and rotor assembly. The first stator unit includes: a first upper stator yoke having a plurality of pole teeth which are formed along its semicircular inner circumference; a first lower stator yoke having a plurality of pole teeth which are formed along its semicircular inner circumference and which mesh with the pole teeth of the first upper stator yoke; and a first coil unit fixedly sandwiched between the first upper and lower stator yokes. The second stator unit includes: a second upper stator yoke punched out as one piece integrally with the first upper stator yoke so as to form an upper twin-stator yoke plate, and having a plurality of pole teeth which are formed along its semicircular inner circumference; a second lower stator yoke punched out as one piece integrally with the first lower stator yoke so as to form a lower twin-stator yoke plate, and having a plurality of pole teeth which are formed along its semicircular inner circumference and which mesh with the pole teeth of the second upper stator yoke; and a second coil unit fixedly sandwiched between the second upper and lower stator yokes and arranged horizontally flush with the first coil unit. And the rotor assembly includes a cylindrical magnet and is rotatably disposed in a circular open space defined by the pole teeth of the first and second stator units. In the low-profile stepping motor described above, one of the upper twin-stator yoke plate and the lower twin-stator yoke plate is structured such that one half of its pole teeth partitioned in half by a predetermined datum line and open spaces each residing between two adjacent pole teeth of the other half are positioned symmetrically about the predetermined datum line, whereby the one twin-stator yoke plate can be used in common to the other twin-stator yoke plate.

According to a second aspect of the present invention, in the low-profile stepping motor of the first aspect, any two pole teeth, that are located adjacent to each other with one pole tooth thereof being formed on the first stator yoke and the other pole tooth formed on the second stator yoke, are shifted from each other by an electrical angle of either 90 degrees or 270 degrees.

According to a third aspect of the present invention, in the low-profile stepping motor of the first or second aspect, the datum line is defined so as to coincide with a center line running midway between the first and second stator yokes.

According to a fourth aspect of the present invention, in the low-profile stepping motor according of the first or second aspect, the datum line is defined so as to pass the center of a hole formed at the one twin-stator yoke plate and adapted to engagingly hold the first coil unit and the center of a hole formed at the one twin-stator yoke plate and adapted to engagingly hold the second coil unit.

Consequently, the components can be reduced in variety, which results in reduced amount of investment in equipment and tool.

DETAILED DESCRIPTION OF THE PREFERRED EMBODIMENTS

Figure 1:
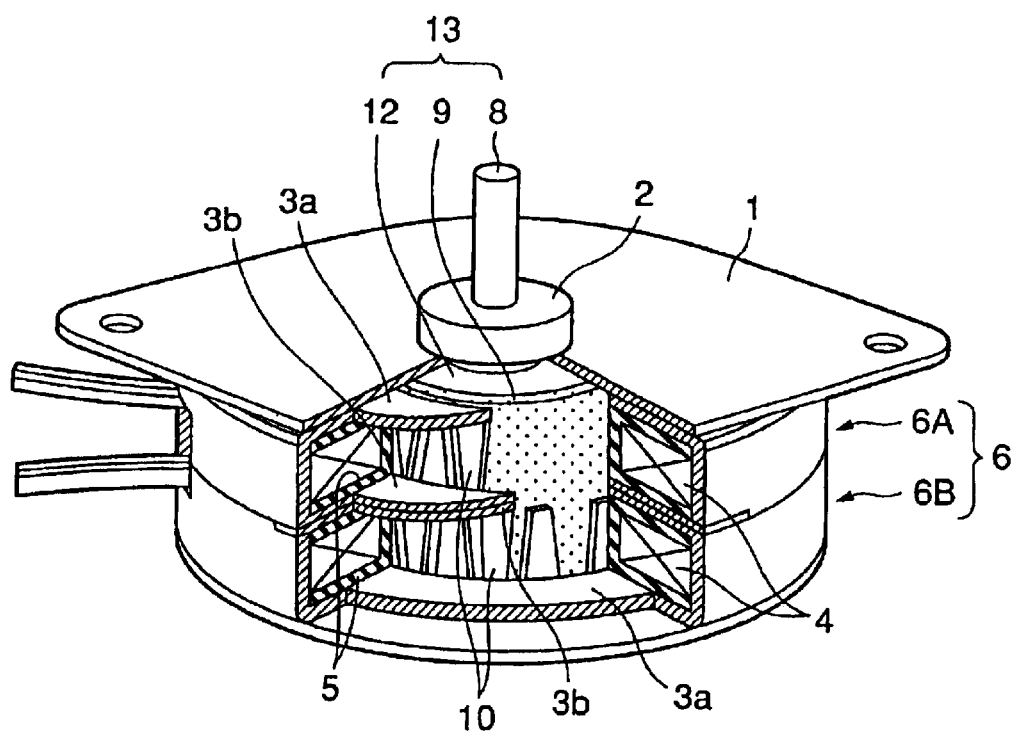
FIG. 1 is a partly cutaway view of a conventional PM stepping motor.
Figure 2:
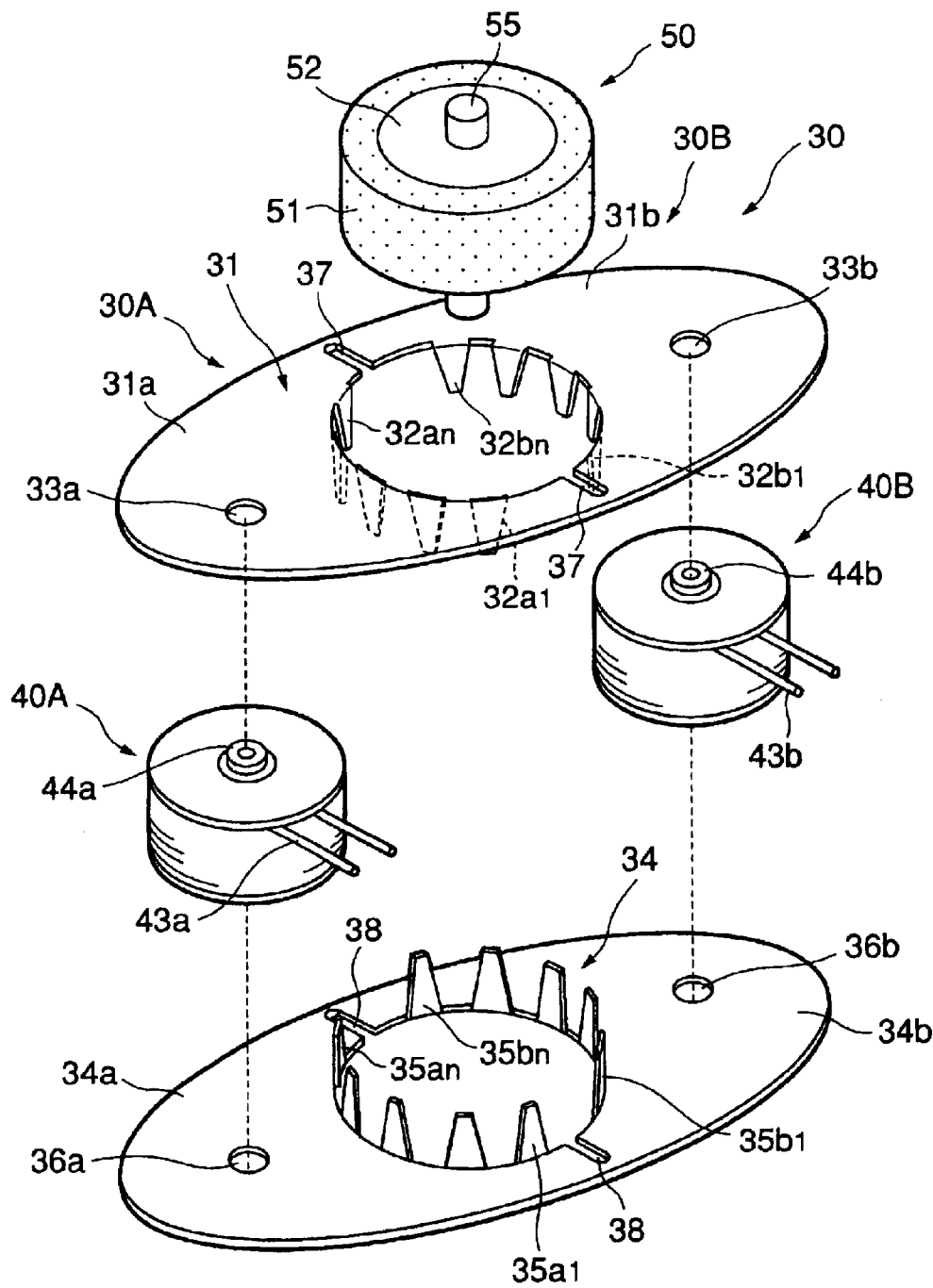
FIG. 2 is an exploded perspective view of a low-profile stepping motor according to an embodiment of the present invention.

Referring to FIG. 2, a low-profile stepping motor of the present invention generally comprises: a stator assembly 30 including first and second stator units 30A and 30B arranged to be horizontally flush with each other; and a rotor assembly 50 rotatably disposed inside the stator assembly 30.

The first stator unit 30A comprises: a first upper stator yoke 31a; a lower stator yoke 34a; and a first coil unit 40A which is composed of a bobbin 41a and a winding 42a provided around the bobbin 41a, is sandwiched between the first upper and lower stator yokes 31a and 34a, and which is provided with terminal pins 43a1 and 43a2. The first upper stator yoke 31a is punched out of a soft magnetic steel plate, includes a plurality of pole teeth 32a1 to 32an punched out simultaneously of the soft magnetic steel plate and bent up inward (downward in FIG. 2) at its semicircular inner circumference, and has a hole 33a for engaging with a top protrusion 44a of the first coil unit 40A. The first lower stator yoke 34a is punched out of a soft magnetic steel plate, includes a plurality of pole teeth 35a1 to 35an punched out simultaneously of the soft magnetic steel plate and bent up inward (upward in FIG. 2) at its semicircular inner circumference, and has a hole 36a for engaging with a bottom protrusion 44a (see FIG. 3) of the first coil unit 40A.

The second stator unit 30B comprises: a second upper stator yoke 31b which is punched out as one piece integrally with the first upper stator yoke 31a so as to form an upper twin-stator yoke plate 31; a lower stator yoke 34b which is punched out as one piece integrally with the first lower stator yoke 34a so as to form a lower twin-stator yoke plate 34; and a second coil unit 40B which is composed of a bobbin 41b and a winding 42b provided around the bobbin 41b, is sandwiched between the second upper and lower stator yokes 31b and 34b, and which is provided with terminal pins 43b1 and 43b2. The second upper stator yoke 31b is punched out of a soft magnetic steel plate, includes a plurality of pole teeth 32b1 to 32bn punched out simultaneously of the soft magnetic steel plate and bent up inward (downward in FIG. 2) at its semicircular inner circumference, and has a hole 33b for engaging with a top protrusion 44b of the second coil unit 40B. The second lower stator yoke 34b is punched out of a soft magnetic steel plate, includes a plurality of pole teeth 35b1 to 35bn punched out simultaneously of the soft magnetic steel plate and bent up inward (upward in FIG. 2) at its semicircular inner circumference, and has a hole 36b for engaging with a bottom protrusion 44b (see FIG. 2) of the second coil unit 40B.

The plurality of pole teeth 32a1 to 32an of the first upper stator yoke 31a and the plurality of pole teeth 32b1 to 32bn of the second upper stator yoke 31b are punched out simultaneously, and the plurality of pole teeth 35a1 to 35an of the first lower stator yoke 34a and the plurality of pole teeth 35b1 to 35bn of the second lower stator yoke 34b are punched out simultaneously.

Each stator yoke has pole teeth provided in number corresponding to the required number of steps per rotation of a stepping motor and arranged equidistant from one another. The pole teeth 32a1 to 32an of the first upper stator yoke 31a and the pole teeth 35a1 to 35an of the first lower stator yoke 34a mesh with each other with a shift by an electrical angle of 180 degrees, and the pole teeth 32b1 to 32bn of the second upper stator yoke 31b and the pole teeth 35b1 to 35bn of the second lower stator yoke 34b mesh with each other with a shift by an electrical angle of 180 degrees.

In each of the upper and lower twin-stator yoke plates 31 and 34 of the first and second stator units 30A and 30B thus structured, two pole teeth located adjacent to each other sandwiching one of a pair of slot cuts 37 or 38 (detailed hereinafter) are shifted from each other by an electrical angle of 90 degrees or 270 degrees. Specifically, in the upper twin-stator yoke plate 31 composed of the first and second upper stator yokes 31a and 31b, the pole tooth 32a1 is shifted by an electrical angle of 90 degrees or 270 degrees from the pole tooth 32b1 located adjacent to the pole tooth 32a1 sandwiching one slot cut 37, and the pole tooth 32an is shifted by an electrical angle of 90 degrees or 270 degrees from the pole tooth 32bn located adjacent to the pole tooth 32an sandwiching the other slot cut 37, and in the lower twin-stator yoke plate 34 composed of the first and second lower stator yokes 34a and 34b, the pole tooth 35a1 is shifted by an electrical angle of 90 degrees or 270 degrees from the pole tooth 35b1 located adjacent to the 35a1 sandwiching one slot cut 38, and the pole tooth 35an is shifted by an electrical angle of 90 degrees or 270 degrees from the pole tooth 35bn located adjacent to the pole tooth 35an sandwiching the other slot cut 38.

The first and second upper stator yokes 31a and 31b are punched out as one piece into the upper twin-stator yoke plate 31 with the pair of slot cuts 37 above mentioned being formed right midway between the first and second upper stator yokes 31a and 31b thereby minimizing magnetic interflow therebetween so as not to have magnetic influence on each other, and the first and second lower stator yokes 34a and 34b are punched out as one piece into the lower twin-stator yoke plate 34 with the pair of slot cuts 38 above mentioned being formed right midway between the first and second lower stator yokes 34a and 34b thereby minimizing magnetic interflow therebetween so as not to have magnetic influence on each other. The upper and lower twin-stator yoke plates 31 and 34 are formed of a soft magnetic steel plate, such as silicon steel plate, SECC (galvanized steel plate) and SUY (electromagnetic soft iron).

The rotor assembly 50 comprises: a cylindrical magnet 51 formed of ferrite magnet, rare-earth magnet and so forth, and magnetized at regular intervals; a rotary shaft 55 made of non-magnetic stainless steel; and a sleeve 52 made of aluminum, and is structured such that the cylindrical magnet 51 is adhesively fixed to the sleeve 52 which has the rotary shaft 55 press-fitted thereinto. The rotor assembly 50 is rotatably disposed inside the stator assembly 30 with a slight gap between the cylindrical magnet 51 and the pole teeth of the stator assembly 30, and always starts rotating in the same direction by means of the first and second stator units 30A and 30B.

Figure 3:
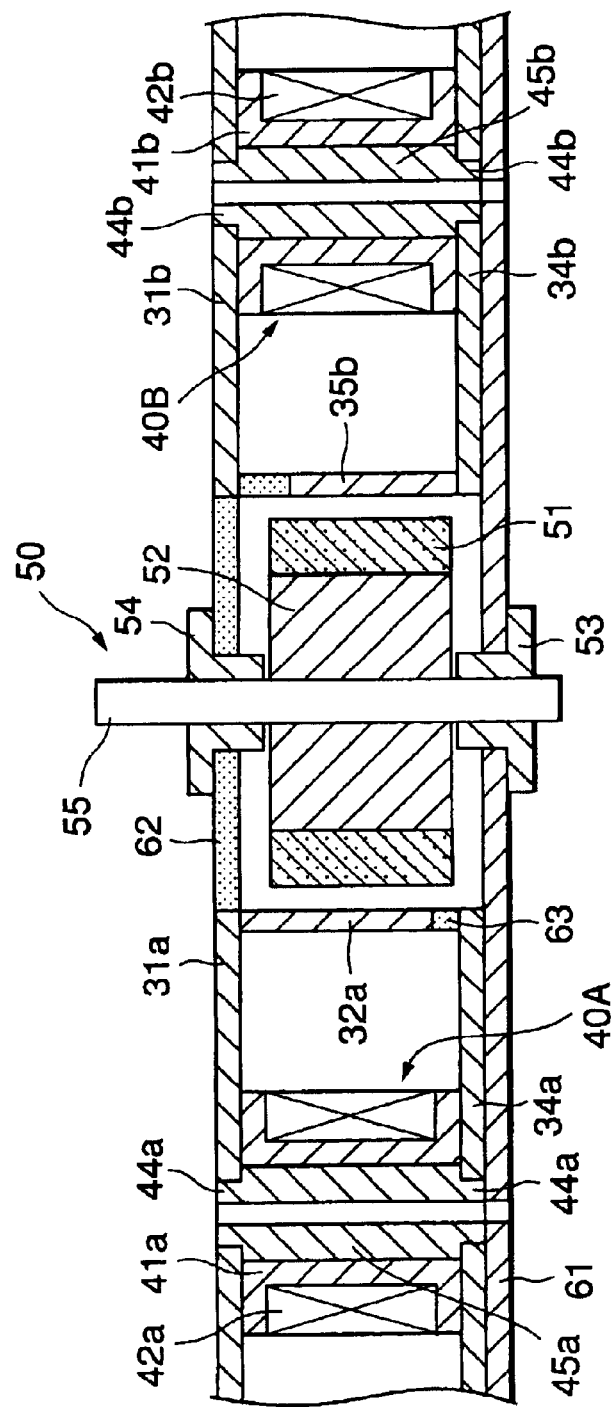
FIG. 3 is a cross sectional view of the low-profile stepping motor of FIG. 2.

Referring now to FIG. 3, the first coil unit 40A includes a cylindrical stud 45a which is formed of metal, has the aforementioned top and bottom protrusions 44a, 44a formed at its respective ends, and which has the aforementioned winding 42a provided therearound, and the second coil unit 40B includes a cylindrical stud 45b which is formed of metal, has the aforementioned top and bottom protrusions 44b, 44b formed at its respective ends, and which has the aforementioned winding 42b provided therearound.

The upper twin-stator yoke plate 31 and the lower twin-stator yoke plate 34 are put together such that the holes 33a and 33b (see FIG. 2) of the upper twin-stator yoke plate 31 engage respectively with the top cylindrical protrusions 44a and 44b of the cylindrical studs 45a and 45b, and the holes 36a and 36b (see FIG. 2) of the lower twin-stator yoke plate 34 engage respectively with the bottom cylindrical protrusions 44a and 44b of the cylindrical studs 45a and 45b.

The cylindrical stud 45a, together with the first upper and lower stator yokes 31a and 34a, forms a part of a closed magnetic path, and the cylindrical stud 45b, together with the second upper and lower stator yokes 31b and 34b, forms a part of a closed magnetic path.

The pole teeth 32a1 to 32an, 32b1 to 32bn, 35a1 to 35an, and 35b1 to 35bn, shown in FIG. 2 are represented respectively by 32a, 32b (not shown), 35a (not shown), and 35b in FIG. 3.

Resin is filled in the gap space between the intermeshing pole teeth thereby forming a resin portion 63 for reinforcement. In this process, a resin plate 62 is formed simultaneously. A bearing 54 is attached to the resin plate 62, and the rotary shaft 55 of the rotor assembly 50 is let through the bearing 54.

And, a plate 61 punched out of a non-magnetic steel plate and having a bearing 53 attached thereto is fixed to the lower twin-stator yoke plate 34 by welding, bonding, crimping and the like. The rotor assembly 50 is rotatably supported by the bearings 53 and 54.

Figure 4B:
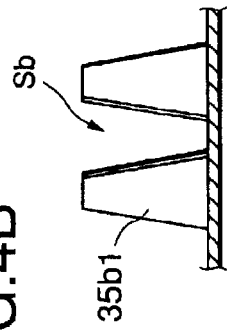
FIG. 4B is a cross sectional view of the lower twin-stator yoke plate of FIG. 4A taken along line A—A.
Figure 4A:
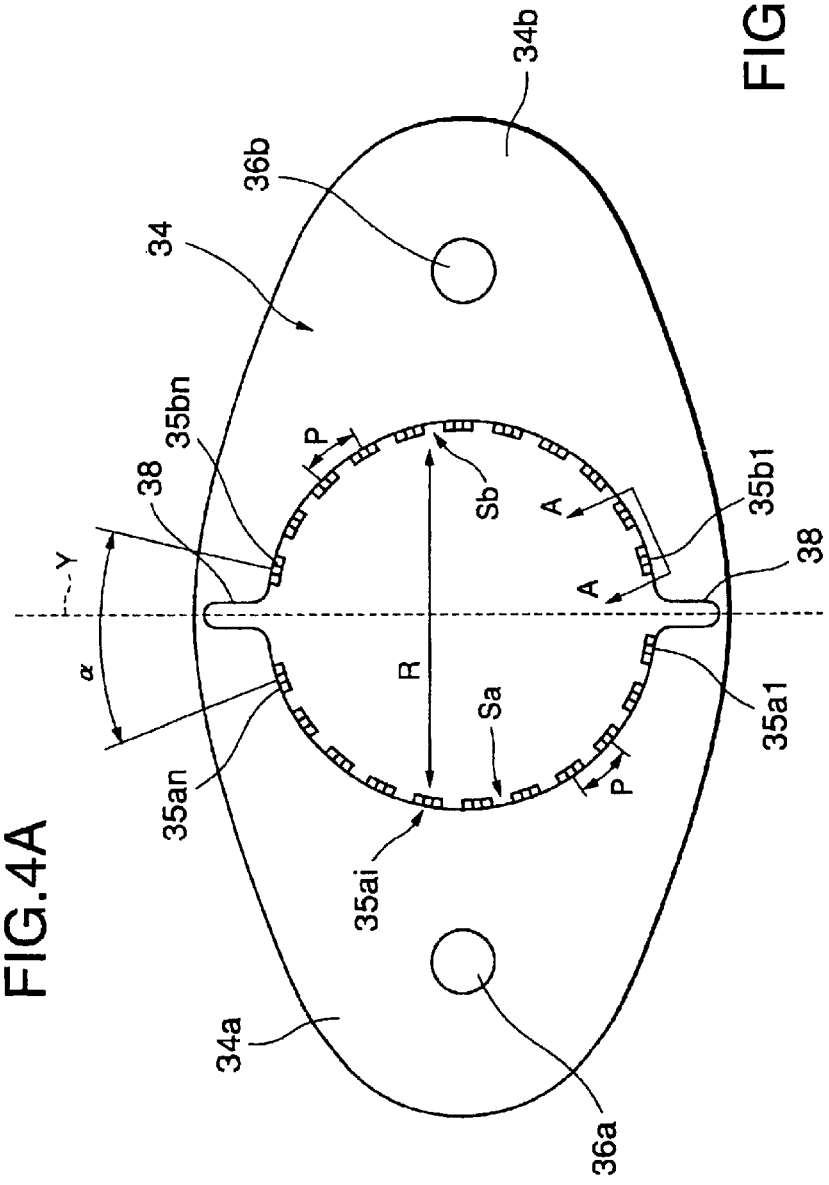
FIG. 4A is a top plan view of a lower twin-stator stator yoke plate of the low-profile stepping motor of FIG. 1.

Referring now to FIG. 4A, the first and second lower stator yokes 34a and 34b are punched out simultaneously as one piece into the lower twin-stator yoke plate 34 such that the first lower stator yoke 34a has the plurality of pole teeth 35a1 to 35an formed along its semicircular inner circumference at a regular interval P, and the second lower stator yoke 34b has the plurality of pole teeth 35b1 to 35bn formed along its semicircular inner circumference at a regular interval identical with the interval P.

As discussed above with reference to FIG. 2, two pole teeth located adjacent to each other sandwiching the slot cut 38 are shifted from each other by an electrical angle which is either 90 or 270 degrees. Further, the pole teeth 35a1 to 35an of the first lower stator yoke 34a and open spaces Sb each residing between two adjacent pole teeth of the pole teeth 35b1 to 35bn of the second lower stator yoke 34b are symmetrically positioned to each other about a dashed datum line Y passing the centers of both slot cuts 38. Accordingly, the pole teeth 35b1 to 35bn of the second lower stator yoke 34b and open spaces Sa each residing between two adjacent pole teeth of the pole teeth 35a1 to 35an of the first lower stator yoke 34a are symmetrically positioned to each other about the datum line Y. Specifically, a pole tooth 35ai of the first lower stator 34a and an open space Sb at the second lower stator 34b indicated by an arrow R are symmetrically positioned about the datum line Y.

With the pole teeth arranged as described above, the pole teeth of one lower twin-stator yoke plate 34 are shifted by an electrical angle of 180 degrees from the pole teeth of another lower twin-stator yoke plate 34 that is turned over about the datum line Y. Thus, the lower twin-stator yoke plate 34 can be used in common to the upper twin-stator yoke plate 31 shown in FIG. 2.

In this connection, the datum line Y may alternatively be defined so as to pass the centers of the holes 36a and 36b.

The plate 61 is attached to the lower side of the low-profile stepping motor in the embodiment discussed above, but may alternatively be attached to the upper side thereof.

The present invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A low-profile stepping motor, comprising:
  a first stator unit including: a first upper stator yoke having a plurality of pole teeth formed along a semicircular inner circumference thereof; a first lower stator yoke having a plurality of pole teeth formed along a semicircular inner circumference thereof, the plurality of pole teeth meshing with the pole teeth of the first upper stator yoke; and a first coil unit fixedly sandwiched between the first upper and lower stator yokes,
  a second stator unit including: a second upper stator yoke punched out as one piece integrally with the first upper stator yoke so as to form an upper twin-stator yoke plate, and having a plurality of pole teeth formed along a semicircular inner circumference thereof; a second lower stator yoke punched out as one piece integrally with the first lower stator yoke so as to form a lower twin-stator yoke plate, and having a plurality of pole teeth formed along a semicircular inner circumference thereof, the plurality of pole teeth meshing with the pole teeth of the second upper stator yoke; and a second coil unit fixedly sandwiched between the second upper and lower stator yokes and arranged horizontally flush with the first coil unit, wherein one of the upper twin-stator yoke plate and the lower twin-stator yoke plate is structured such that one half of its pole teeth partitioned in half by a predetermined datum line and open spaces each residing between two adjacent pole teeth of the other half are positioned symmetrically about the predetermined datum line,
  a resin plate formed simultaneously with a resin which is filled between the pole teeth of the first and second stator units, and
  a rotor assembly including a cylindrical magnet and rotatably disposed in a circular open space defined by the pole teeth of the first and second stator units.

2. A low-profile stepping motor according to claim 1, wherein any two pole teeth located adjacent to each other with one pole tooth thereof being formed on the first stator yoke and the other pole tooth formed on the second stator yoke are shifted from each other by an electrical angle of either 90 degrees or 270 degrees.

3. A low-profile stepping motor according to claim 1, wherein the datum line is defined so as to coincide with a center line running midway between the first and second stator yokes.

4. A low-profile stepping motor according to claim 1, wherein the datum line is defined so as to pass a center of a hole formed at the one twin-stator yoke plate and functioning to engagingly hold the first coil unit and a center of a hole formed at the one twin-stator yoke plate and functioning to engagingly hold the second coil unit.

5. A low profile stepping motor according to claim 1, wherein the resin plate is formed in an opening of the upper twin-stator yoke plate.

* * * * *